Aug. 28, 1962  A. A. MILLER  3,051,021
AUTOMATIC CHANGE SPEED GEARS
Filed Oct. 13, 1959  7 Sheets-Sheet 3

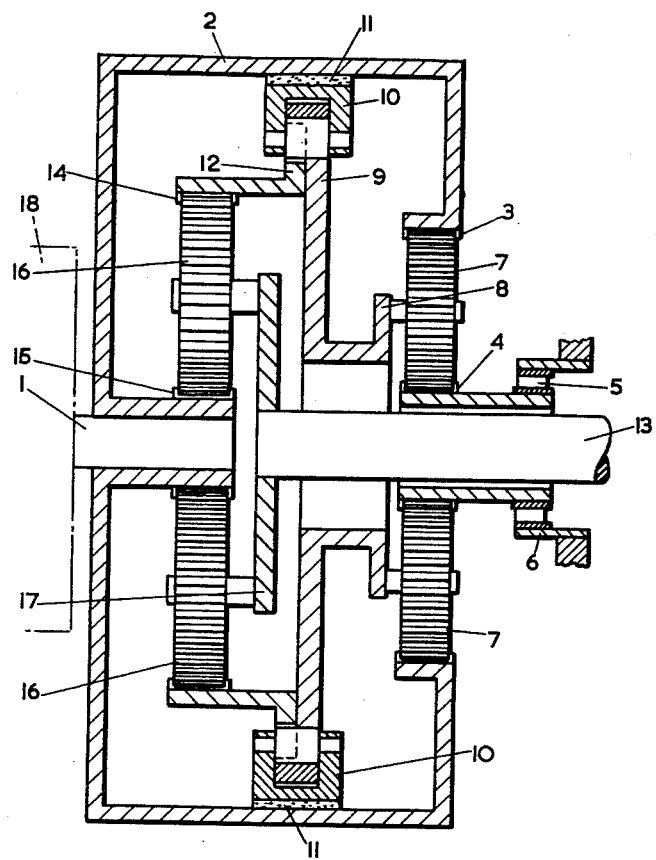
FIG. I

INVENTOR
ALBERT ARTHUR MILLER
BY Hauer and Nydick
ATTORNEYS

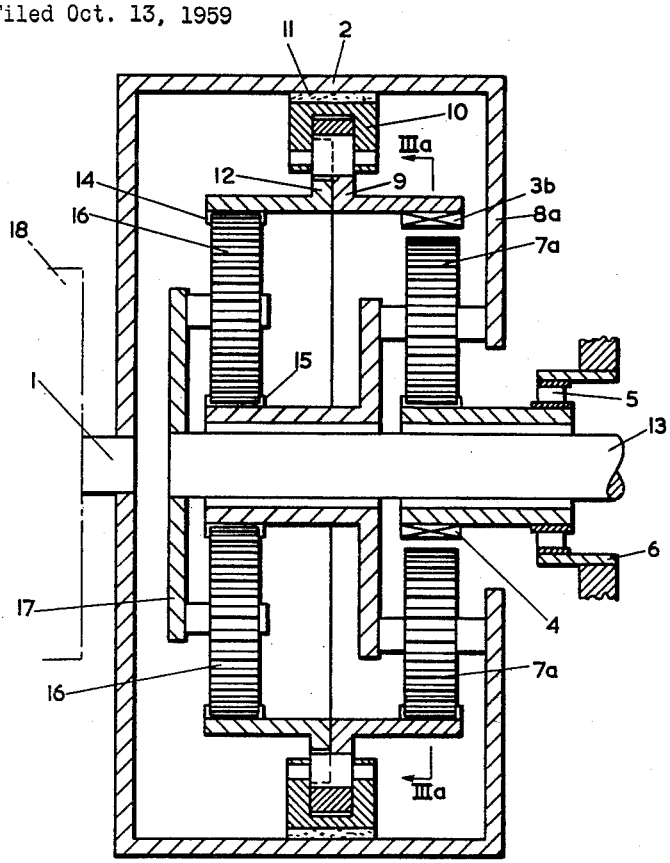
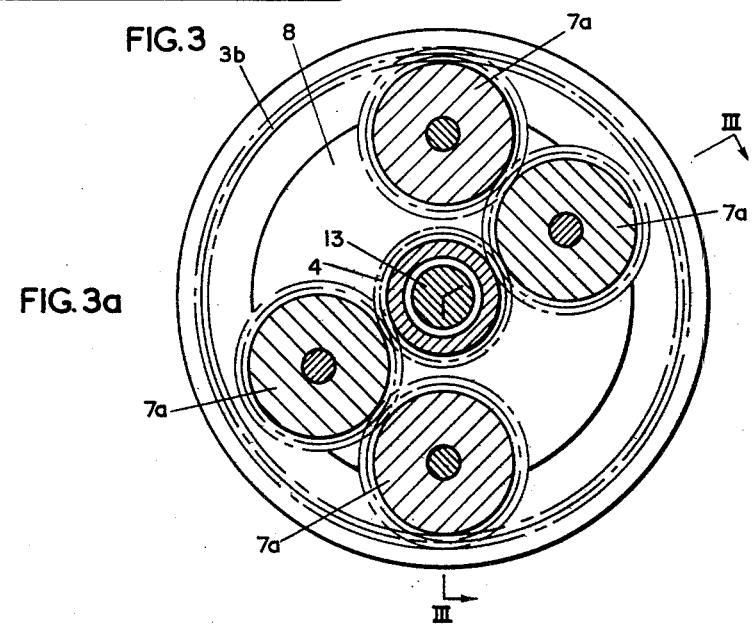
FIG.3
FIG.3a

Aug. 28, 1962     A. A. MILLER     3,051,021
AUTOMATIC CHANGE SPEED GEARS
Filed Oct. 13, 1959     7 Sheets-Sheet 7

United States Patent Office 3,051,021
Patented Aug. 28, 1962

3,051,021
AUTOMATIC CHANGE SPEED GEARS
Albert Arthur Miller, Esher, England, assignor to Self-Changing Gears Limited, Coventry, England, a company of Great Britain
Filed Oct. 13, 1959, Ser. No. 846,107
Claims priority, application Great Britain Oct. 15, 1958
16 Claims. (Cl. 74—751)

This invention relates to automatic change speed gears and has particular reference to automatic change speed gears of the general character described in U.S. Patent 2,972,909.

In such gears an increase in torque to an upper limit and/or a reduction in rotational speed to a lower limit (depending on the torque transmitted) will initiate a down change, i.e. a change of ratio from the higher toward the lower gear ratio. The down change commences with the slipping of the centrifugal clutch under the influence of the torque load being transmitted, and assuming that the torque load and output speed remain substantially constant during the transition to the lower gear ratio, the acceleration of the input member to the extent required to complete the change of gear ratio is dependent on a reduction of the coefficient of friction when the clutch is slipping as compared with the coefficient of static friction before slipping commenced, since the clutch shoes do not receive any retractive influence from the pin-and-slot device until the change of speed ratio is completed and the free wheel has locked, and commenced to transmit torque in the low gear ratio.

Now the torque produced by most internal combustion engines usually falls slightly with the increase in speed resulting from a down change in the gears which they drive, but the automatic gears according to my British Patent No. 740,692 or corresponding United States Patent 2,972,909 nevertheless behave satisfactorily in these circumstances because the coefficient of friction at the clutch surfaces lessens to a sufficient degree when slipping commences.

There are certain special circumstances however, when the reduction in coefficient of friction would not be sufficient to ensure that the input member would complete its acceleration to the lower gear ratio, and the clutch would be liable to continue slipping, and so become damaged by overheating (remembering that there would be no retractive force to disengage it until the input member completes its acceleration to the lower gear ratio).

These special circumstances obtain when the characteristics of the prime mover are such that an increase in its speed is accompanied by a substantial reduction in torque (as for example in the case of a "constant horse power" type of internal combustion engine), or in the case of certain types of electric motor. The best example, however, of the special circumstances is in the case of a hydro-kinetic torque converter being included in the drive between a prime mover of relatively constant speed and an automatic change speed of the type referred to.

It is the normal function of such a torque converter, being driven at a relatively constant speed by a prime mover, to deliver to the machine which it is driving, a torque which varies approximately in inverse proportion to the speed of the machine over a certain range of this speed. For example when the ratio of the converter output speed to converter input speed lies between the limits of 0.8 and 0.4, the power which it delivers at its output shaft is substantially constant, consequently the torque is inversely proportional to the speed over this speed range.

Now if an automatic gear of the type referred to in U.S. Patent 2,972,909 would operate satisfactorily when incorporated in the drive between the torque converter and the machine which it drives, this would have the effect of extending the range of speed through which the machines could be driven with substantially constant power, this being a very desirable achievement in certain applications of power, as for example in rail traction or road haulage vehicles.

It is an object of the present invention to provide an automatic change speed gear which operates generally on the principles of the invention under U.S. Patent 2,972,909, but which does not suffer from the disabilities referred to above when the special circumstances, also referred to above, prevail.

The improvement resides in the kinematic arrangement of the geared elements which, in combination, provide the change speed ratio desired, while at the same time providing a driving member for the centrifugally-sensitive element of the clutch which causes the latter to decelerate in suitable proportion to the acceleration of the input member when the down change occurs, thus reducing the torque-transmitting characteristic of the clutch to match the torque-speed characteristic of the power supply to the input.

During an up-change the converse occurs, i.e. the centrifugal element of the clutch is caused to accelerate in suitable relation to the deceleration of the input, and this increases the torque-transmitting characteristic of the clutch to match the rising torque delivered to the input as a result of its speed reduction resulting from the engagement of the higher gear ratio.

In this way it is possible to ensure that the engagement and disengagement of the gear-changing clutch will proceed to completion when once it has started to operate, without requiring any change in output speed during the transition.

The invention consists broadly of an automatic change speed gear, in which one of the elements in a relatively low speed transmission train forms one element of a friction clutch adapted to engage a complementary element to establish a relatively high speed transmission train, and in which a first force, which varies with the torque transmitted by said low speed transmission train, tends to pull said clutch elements out of engagement, and a second force, which varies with the speed of rotation of said one clutch element, tends to press said clutch elements into engagement, wherein, during low speed transmission, said one clutch element rotates at a lower speed than said complementary clutch element, so that said one clutch element, during change up from said low speed transmission to said high speed transmission, undergoes an increase in speed which increases said second force, and said one clutch element, during change down from said high speed transmission to said low speed transmission, undergoes a decrease in speed which decreases said second force, whereby any tendency of said clutch to slip after engagement during a change up, and any tendency of said clutch to re-engage after disengagement during a change down, is opposed.

In order that the invention may be more clearly understood, there will first be described an embodiment of automatic change speed gear unit in accordance with U.S. Patent 2,972,909 and then, by way of example only, a number of automatic change speed units in accordance with the present invention, reference being made to the accompanying drawings, wherein:

FIG. 1 is a longitudinal section of one of the units constructed in accordance with the present invention.

FIG. 3 is a similar view of a third one of said units, the section being on line III—III of FIG. 3a.

FIG. 3a is a section on line IIIA—IIIA of FIG. 3.

Figure 1A:
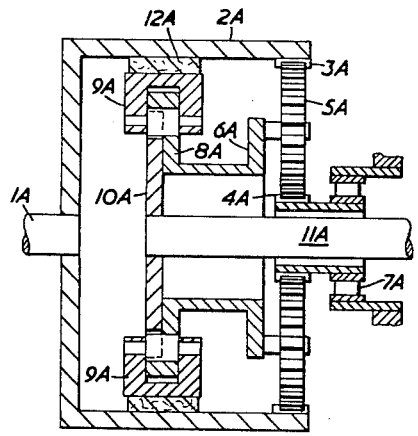
FIG. 1A is a longitudinal section of an embodiment of change speed gear unit constructed according to U.S. Patent 2,972,909.

Referring first to FIG. 1A, the input to the unit is to a shaft 1A rigidly connected to a rotatable drum 2A whose inner periphery carries rigidly an internally toothed gear 3A. Coaxial within said drum is a stationary sun gear 4A, and in mesh with both said sun gear and said internally toothed gear 3A are, say, three or more planet gears 5A at equal angular intervals around the axis of said drum. These planet gears 5A are mounted on a rotatable planet carrier 6A. A free wheel device 7A is connected between the sun gear and the fixed arbor on which the sun gear is mounted, so that the sun gear can rotate forward but not backward. The planet carrier is coupled, through the medium of its input plate 8A, a set of friction shoes 9A and an output plate 10A, to the output shaft 11A. The precise correlation of the input plate 8A, the friction shoes 9A and the output plate 10A will be described later. For the moment it is sufficient to say that the friction shoes 9A are biased outwardly to the position at which their friction linings 12A engage the inner periphery of the drum 2A, and in response to torque being developed, through said friction shoes, between said input plate 8A and said output plate 10A, said friction shoes are urged inwardly, in opposition to their bias, and out of engagement with said drum. It will be seen that when the two clutch elements, that is, the friction shoes 9A and the drum 2A, are out of engagement, the unit transmits with a step-down speed ratio, the drum 2A causing the planet gears 5A to roll round the stationary sun gear 4A and thereby rotate the planet carrier 6A at a speed less than that of the drum, and the planet carrier rotating the output through said input plate 8A and the friction shoes 9A. If, however, the drum 2A and the friction shoes are in clutching engagement, a direct drive will be obtained from the drum 2A to the friction shoes and from said connecting link to the output plate 10A and output shaft 11A. The planet carrier 6A will idle round en bloc with the drum 2A and friction shoes 9A, and the sun gear 4A will also rotate en bloc with the carrier, this being permitted by the free wheel device 7A.

The engagement and disengagement of the clutch elements (drum 2A and friction shoes 9A) is controlled according to both speed and torque. This is to say the disengagement is effected when the torque is above a given value which is greater or less according as the speed is greater or less, and the engagement is effected when the torque is below a given value which is greater or less according as the speed is greater or less.

Thus, when the unit is at rest and no torque is applied to the drum 2A, the friction shoes 9A will be maintained under their bias in clutching engagement with said drum, and the unit will be in condition for direct drive. When now torque is applied to the drum 2A, assuming that the load on the output shaft 11A is appreciable, say, by the vehicle in which the unit is employed being on level ground and heavily laden, the torque, before the output shaft 11A begins to rotate, will rise to a value, depending on the strength of the outward spring bias on the friction shoes 9A, at which the drum 2A will overrun said friction shoes by slippage. When this happens, torque will be transmitted from the drum 2A to the output shaft 11A by the speed reduction path, that is, from the drum to the planet carrier 6A, and thence through the friction shoes 9A to said output shaft 11A. This torque will pull said friction shoes 9A inwardly out of engagement with the drum 2A, and the unit will be at the condition for speed reduction drive.

Assuming now that the unit is transmitting to the output shaft 11A under conditions of speed reduction, that is, with the friction shoes 9A held out of engagement with the drum 2A by the torque on the planet carrier 6A, said friction shoes will be rotating at the speed of said output shaft, and said friction shoes will be urged toward the drum-engaging position by centrifugal force depending on the speed of rotation of said output shaft. This force will augment the force exerted by the spring bias. When the torque falls or when the speed increases to a value such that the total engaging force exerted on the friction shoes 9A, by centrifugal force and the spring bias, prevails over the disengaging force exerted by said torque, said friction shoes will engage with the drum 2A and the direct drive will be established. It will be seen that the higher is the speed, the higher will be the torque at which this change is effected. It will be seen that immediately the linings 12A of the friction shoes 9A touch the drum 2A there will be a reduction in the torque transmitted by way of the speed reduction path. This causes a reduction in the force tending to disengage the friction shoes 9A, and thus the friction shoes rapidly acquire the full engaging force necessary for direct transmission of the torque so that there will be no sustained slippage and no force tending to disengage the friction shoes, as there will be no torque transmitted via the speed reduction path through the friction shoes acting as links.

Assuming now that the unit is driving the output element with a direct drive, there will be a drum-engaging force acting on the friction shoes 9A which is due to the force exerted by the spring bias and a centrifugal force depending, as before, on the speed of rotation of the output element 11A. There will be no drum-disengaging force acting on the friction shoes. When the torque exceeds a given value, slippage will take place and the drum 2A will overrun the friction shoes 9A. When the consequential and appropriate disparity of input and output speeds ensues, a certain amount of torque will be transmitted through the speed reducing path, that is, through the planet carrier 6A, the input plate 8A and the friction shoes 9A acting as connecting links, and thus a drum-disengaging force will be developed acting on the friction shoes. This will increase the torque transmitted through the speed reducing path, which will again increase the disengaging force, and this in a very short period the friction shoes 9A will be moved to the fully disengaged position, and the condition for speed reduction with the torque multiplication will obtain.

Figure 2A:
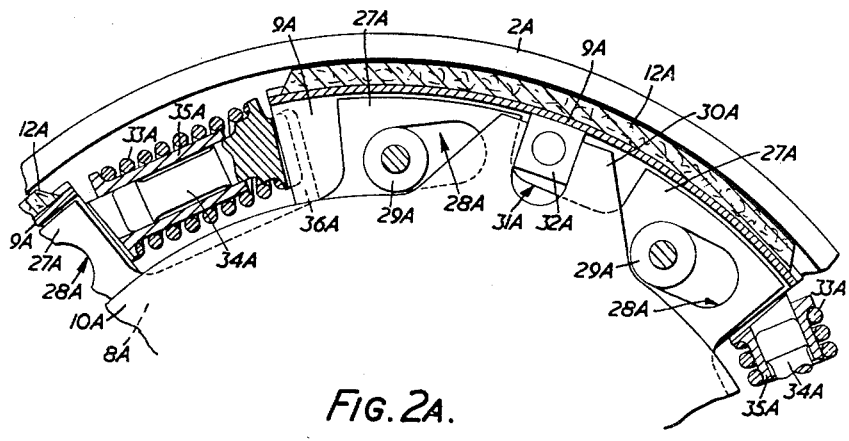
FIG. 2A is a fragmentary cross section showing the connection between the input plate, friction shoes and output plate of said embodiment.

The precise correlation of the input plate 8A, friction shoes 9A and output plate 10A is shown in FIG. 2A. Referring to that figure, the planet carrier or input plate 8A has outwardly projecting portions at intervals around its edge, and two of said projecting portions 27A extend into a central recess of each friction shoe 9A. Each projecting portion has a slot 28A through it, through which passes a pin or roller 29A mounted on the shoe within said recess. It will be seen that the axes of said pins or rollers 29A are parallel to the axis of the drum 2A.

The slot and pin connections 28A, 29A between said planet carrier and said shoes permit of a lost motion rotary movement between said planet carrier and said shoes, and the slots 28A are so inclined that when the planet carrier is at the forward limit of its movement relative to said shoes, as in FIG. 2A, said shoes are held inwardly against their bias out of engagement with the inner periphery of the drum 2A, and when said planet carrier is at the rearward limit of its movement relative to said shoes, said shoes are permitted to engage the inner periphery of the drum.

The output plate 10A is also formed with a number of radial projections 30A which extend into said recess in the shoes, one into each shoe. Each of these radial projections 30A has a radial slot 31A in it, in which a driving block 32A secured to the shoe slidably engages.

It will thus be seen that the output plate is constrained to rotate with the shoes, the slot and driving block connections 31A, 32A, however, permitting the shoes to move radially to their engaged and disengaged positions.

The pin-and-slot connections 28A, 29A for each shoe are located near the forward and rear ends thereof, as shown in FIG. 2A, so that each shoe is maintained level as it moves to its disengaged and engaged positions. The slot-and-driving-block connections 31A, 32A for each shoe are located midway between the ends of the shoe.

It will now be seen that when the friction shoes 9A are at their disengaged position, the planet carrier 8A will drive the output shaft 11A, through the pin-and-slot connections 28A, 29A, the shoes themselves and the driving-block-and-slot connections 31A, 32A. Also lowing to the pin-and-slot connections 28A, 29A, the shoes will be held at their disengaged positions. When the friction shoes are at the engaged position, the drive will be direct from the drum 2A to the shoes, and hence there will be direct drive from the drum to the output shaft 11A. Also there will be no inward pull tending to operate the shoes of that unit to the disengaged position. The outward biasing of the shoes is effected by means of compression springs 33A between the adjacent ends of the shoes. These springs 33A are mounted on telescopic guides having inner and outer elements 34A and 35A, the ends of which are forked and engage recesses 36A in the end faces of the shoes.

The above-described structure of FIGS. 1A and 2A corresponds to that of FIGS. 3 and 8 of U.S. Patent 2,972,909. The various units of automatic change speed gear in accordance with the present invention will now be described.

Figure 2:
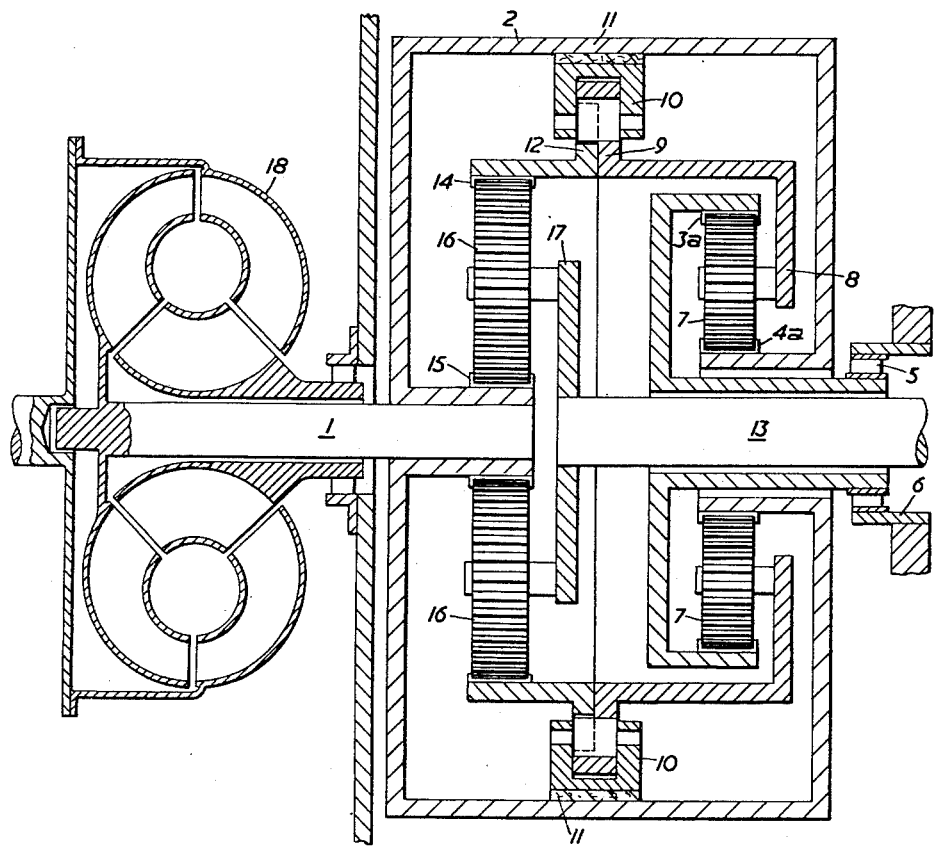
FIG. 2 is a similar view of another of said units.

In all these units it is assumed that the input shaft 1 is driven through the medium of a hydrokinetic torque converter indicated diagrammatically at 18, with particular reference to FIG. 2.

Referring first to FIGURE 1, the input to the unit is to a shaft 1 rigidly connected to a rotatable drum 2 which carries rigidly an internally toothed gear 3. Coaxially within said drum is a sun gear 4 mounted, with a free wheel 5 in between, on a fixed arbour 6, so that said sun gear 4 is free to rotate forwards, i.e. in the same direction as the shaft 1, but is restrained against rotation backwards. In mesh with both said sun gear 4 and the internally toothed gear 3 are, say, three or more planet gears 7, at equal intervals around the axis of the drum. These planet wheels are mounted on a rotatable planet carrier 8, which is connected direct to an input plate 9 which is coupled, through the medium of a set of friction shoes 10, lined with friction material 11, with an output plate 12. The connection of the input plate 9 to the output plate 12 through the medium of the friction shoes 10 is the same as the connection of the input plate 8a to the output plate 10a through the medium of the friction shoes 9a described above in relation to FIGS. 1A and 2A, the function being such that the greater is the torque transmitted from said input plate 9 to said output plate 12, the greater is the inward force on said shoes 10 tending to disengage their friction linings from the inner periphery of the drum 2. On the other hand the greater is the speed of rotation of said shoes 10, the greater is the centrifugal force acting outwardly on said shoes to tend to engage their friction linings with the internal periphery of said drum 2.

It is to be noted that, as in the case of the described embodiment of U.S. Patent 2,972,909 it is the coupling of the input plate to said friction shoe which causes the transmitted torque to set up a force forcing the friction shoe inwards away from the drum 2, and thus, when said friction shoe is in engagement with said drum, this inward force ceases altogether.

As so far described, the unit is the same as that of the described embodiment of U.S. Patent 2,972,909, but it differs from that embodiment in that the output plate, instead of being connected directly to the output shaft, is connected to the internally toothed outer annulus 14 of an auxiliary epicyclic gear whose sun gear 15 is fast with the input shaft 1 and drum 2. The planet gears 16 of said epicyclic gear, which are in mesh both with said annulus 14 and said sun gear 15, are mounted on a planet carrier 17 which is connected direct to said output shaft 13.

In the unit of FIGURE 1, when the low speed transmission is in operation, the friction linings 11 of the friction shoes 12 are out of engagement with the drum 2 and the transmission train is from the shaft 1, drum 2 and internally toothed annulus 3, through the planet gears 7 to the planet carrier 8, and thence, through the input plate 9, and the friction shoes 10 acting as a link, to the output plate 12 and internally toothed annulus 14, and thence through the planet wheels 16 to the planet carrier 17 and the output shaft 13. This arrangement gives a speed reduction from the input shaft 1 to the output shaft 13, but it will be seen that the annulus 14 of the auxiliary epicyclic gear, and therefore the friction shoes 10, are rotating at a lower speed than the output shaft 13.

When, owing to increase in speed and/or decrease in the transmitted torque, the centrifugal force acting outwardly on the friction shoes 10 (plus an outward spring bias similar to that shown in FIGURE 8 of said prior specification if such is employed) prevails over the inward force on said friction shoes owing to the transmitted torque, the linings 11 of the friction shoes will engage the drum thereby initiating a direct drive by causing all the parts to rotate en bloc. This eventually reduces the speed of the input shaft, and therefore of the output element of the torque converter 18, to the speed of the output shaft 13. The speed of rotation of the friction shoes 10 is increased to the same speed, so that the centrifugal force pressing said friction shoes against the drum 2 is correspondingly increased. In other words, at the very moment when the speed of the output member of the torque converter 18 is decreased and its torque accordingly increased, the speed of the friction shoes 10 is increased and their clutching force accordingly increased. Thus concurrently with the increase in the torque transmitted by the torque converter 18, there is an increase, in the clutching force of the friction shoes 10. By proper design these two increases can be made to cancel each other out, thus ensuring progressive action of the automatic speed change and this, of course, will obtain both when changing up and changing down.

More particularly, since the torque transmitting capacity of a centrifugal clutch varies as the square of its speed, it follows that, during a change of gear, the speed change of the friction shoes 10 should be as the square root of the speed change of the input (based on the assumption that the torque delivered to the input from the torque converter 18 varies in inverse proportion to its speed).

For example, if the resultant overall gear step from the shaft 1 to shaft 13 is $1+n$, then $n$ represents the difference in speed of the shaft 1 before and after a change of gear. Likewise if $x$ represents the difference in speed of the friction shoes 10 before and after the change, then $1-x$ represents the friction shoe speed in the low gear and 1.0 the friction shoe speed in the high gear.

It may be assumed that the torque from the converter 18 varies in inverse proportion to its output speed over the range of output speed of said torque converter with which we are concerned, on which assumption $1+n$ represents the torque multiplication when an up change occurs. Therefore if the centrifugal effort of the clutch is to match the torque from the converter before and after the gear change it follows that $$\left(\frac{1}{1-x}\right)^2 = 1+n$$

from which $x = 1-(1+n)^{-\frac{1}{2}}$ $$\frac{(n+1)^{1/2}-1}{(n+1)^{1/2}}$$

It also follows that the relationship between the sun 5 and annulus 14 of the auxiliary train should be substantially as $x$ and $n$ respectively.

In practice, in the above described arrangement, the main epicyclic gear 3, 4, 7 would give a reduction of less than 2 to 1 and the overall gearing would give a reduction of less than 1.6 to 1.

Referring now to FIGURE 2, this differs from FIGURE 1 in that the sun wheel 4a of the main epicyclic gear is fast with the drum 2 (i.e. to the input shaft 1) instead of constituting the reaction member controlled by the free wheel device 5, and the outer annulus 3a of said main epicyclic gear constitutes the reaction member, controlled by said free wheel device 5, instead of being fast with said drum. With this arrangement the main epicyclic gear 3a, 4a, 7, will of necessity give a reduction of more than 2 to 1, and the overall reduction will be more than 1.6 to 1.

In other respects FIGURE 2 is the same as FIGURE 1 and the same references are applied to corresponding parts.

Referring to FIGURE 3, this figure differs from FIGURE 1 in respect of the main epicyclic gear. Thus the planet wheels 7a of said main epicyclic gear are grouped in pairs (see FIGURE 3a), those of each pair being in mesh with one another, and one of such pair being also in mesh with the sun wheel 4 while the other is in mesh with the outer annulus 3b. On FIGURE 3a only two pairs of planet wheels 7a are shown, but in practice there would usually be at least three pairs.

FIGURE 3 also differs from FIGURE 1 in that the planet carrier 8a of the main epicyclic gear is the input member, being fast with the drum 2, and the outer annulus 3b is the output member being fast with the input plate 9. In other respects FIGURE 3 is the same as FIGURE 1 and the same references are applied in corresponding parts. (It is noted that the sun wheel 15 of the auxiliary epicyclic gear is fast with the planet carrier 8a of the main epicyclic gear and therefore with the drum 2 as in FIGURE 1).

With this unit of FIGURE 3, the output member (i.e. the annulus 3b) of the main epicyclic gear may rotate at about half the speed of the input member (i.e. the planet carrier 8a).

Figure 4:
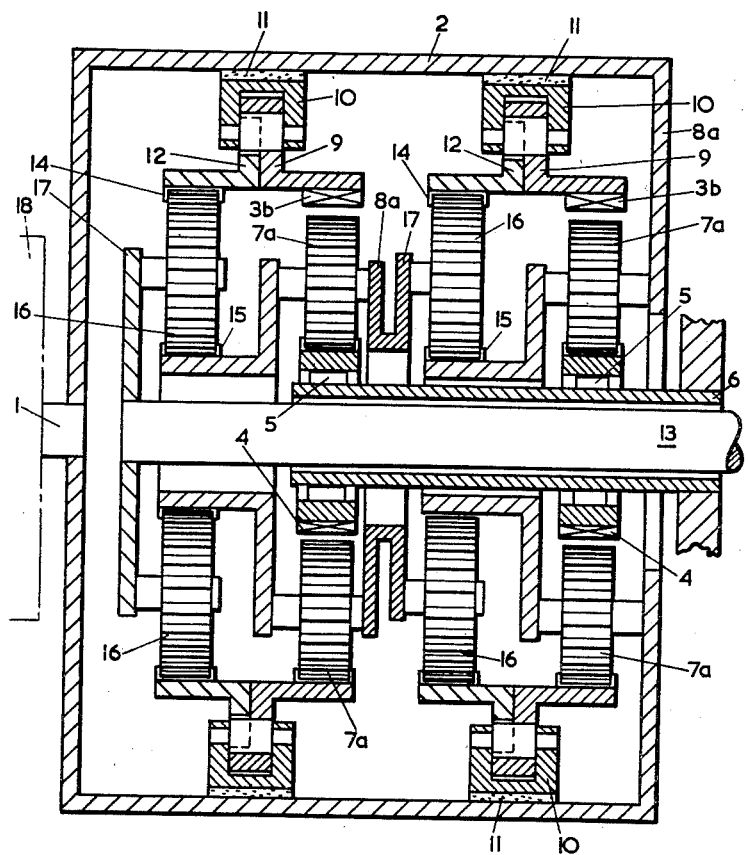
FIG. 4 is a longitudinal section showing two units according to FIGS. 3 and 3a connected in series.

The unit illustrated in FIGURE 3 lends itself conveniently to several of such units being connected in series in a common drum. Such an arrangement, consisting of two units, is illustrated in FIGURE 4. Referring to this figure, it will be seen that the planet carrier 17 of the auxiliary epicyclic gear of the first unit (the one to the right) is connected direct to the planet carrier 8a of the main epicyclic gear of the second unit, the planet carrier 17 of the auxiliary epicyclic gear of the second unit being connected direct to the output shaft.

Assuming that the arrangement of FIGURE 4 is operating with the brake shoes 10 of both units out of engagement with the drum, and both units therefore transmitting in series at the lower speed ratio, if rising speed and/or falling torque causes the brake shoes 10 of the first unit to engage the drum 2, thereby setting up a direct drive from the drum to the input 8a of the second unit, the speed of the main input 1 (i.e. the output element of the torque converter 18) will undergo a sudden decrease and its torque will accordingly undergo an increase, but, as previously described, the speed of the brake shoes 10 of the first unit will also undergo an increase and therefore there will be an increase in the clutching force between said brake shoes and the drum which will compensate for the increase of torque.

The same will apply when the brake shoes 10 of the second unit engage the drum 2 under the influence of increase in speed and/or decrease in torque, thereby setting up a direct drive from the input shaft 1 to the output shaft 13. In equivalent manner, when the brake shoes 10 of either unit commence to slip under the influence of rising torque and/or falling speed, they will undergo a sudden reduction of speed simultaneously as the output element of the torque converter 18 undergoes a sudden increase in speed and therefore decrease of torque. The decrease of the speed, and therefore the decrease in clutch-engaging force, of the brake shoes will compensate for the decrease of torque, and prevent said brake shoes from immediately binding again with the brake drum.

It will be noted that, in FIGURE 4, a common arbour 6 has the sun wheels 4 of both main epicyclic gears mounted on it through respective free wheel devices 5.

Figure 5:
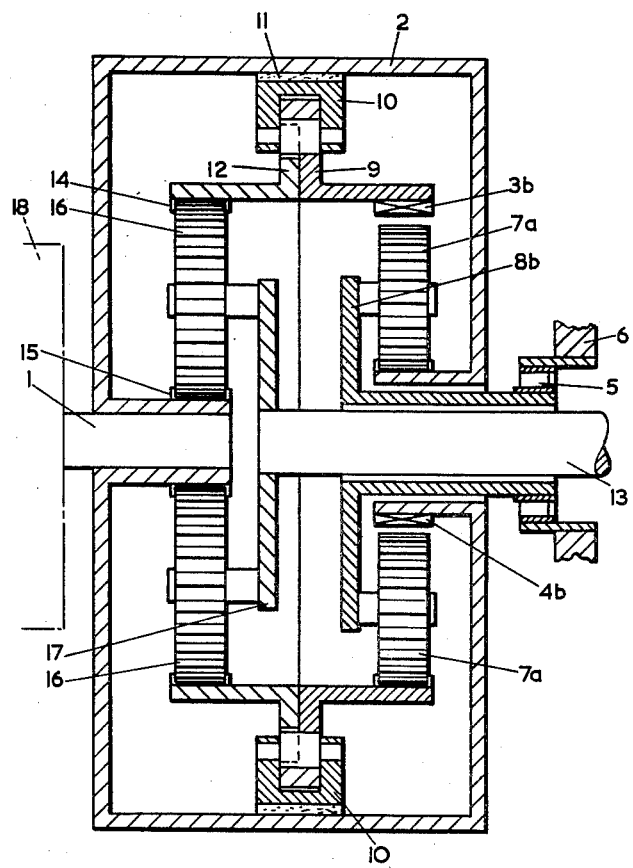
FIG. 5 is a longitudinal section of another of said units.

Referring to FIGURE 5, this illustrates a unit in which, like FIGURES 3, and 3a, the main epicyclic gear is of the kind having pairs of planet pinions 7a, but said main epicyclic gear of FIGURE 5 differs from that of FIGURES 3 and 3a in that the sun gear 4b forms the input, being fast with the casing 2 and the planet carrier 8b forms the reaction member, being connected through the free wheel device 5 to the arbour 6. Like FIGURES 3 and 3a the outer annulus 3b of said main epicyclic gear forms the output, and, in all other respects the unit is like that of FIGURES 3 and 3a.

Figure 6:
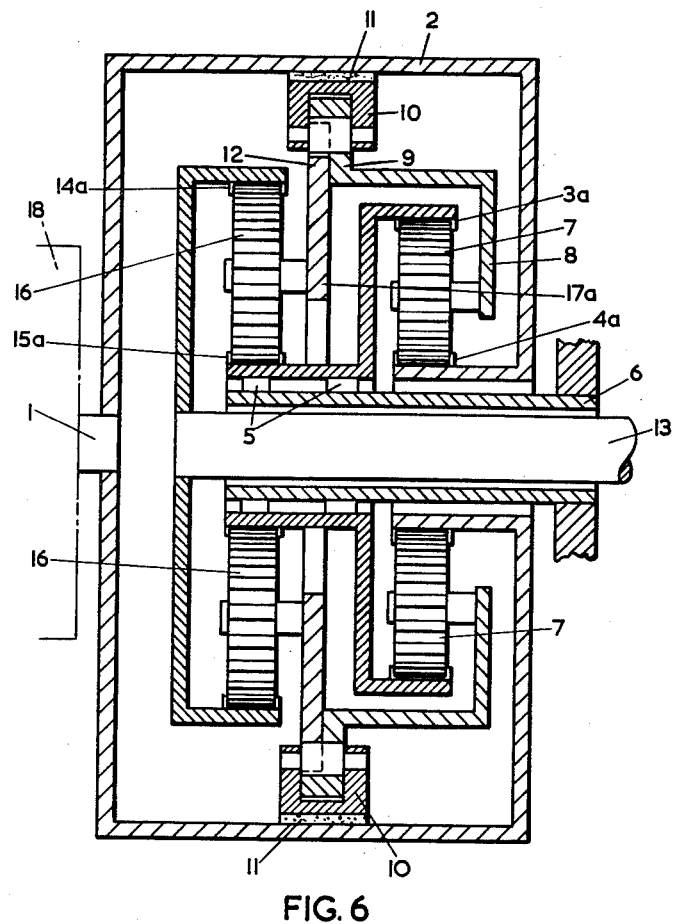
FIG. 6 is a similar view of still another of said units.

Referring to FIGURE 6, this illustrates a unit in which the main epicyclic gear is the same as that of FIGURE 2, but the auxiliary epicyclic gear differs from that of FIGURE 2 in that the planet carrier 17a of said auxiliary epicyclic gear, instead of forming the output, forms the input, being connected direct to the output plate 12 of the friction shoes, and the outer annulus 14a instead of forming the input from the output plate 12, being connected direct to the output shaft 13, and the sun wheel 15a, instead of being fast with the drum 2 and input shaft 1 is fast with the outer annulus 3a of the main epicyclic gear. Thus the main and auxiliary epicyclic gears have a common reaction member.

With this form of compounding it is still true that, when the lower speed is in operation, the friction shoes are rotating at a lower speed than the output shaft, so that the unit will function in like manner as the units of the preceding figures.

The unit of FIGURE 6, like that of FIGURES 3 and 3a, lends itself conveniently to several of such units being connected in series in a common drum.

Many other forms of unit will suggest themselves. The essential feature is that the friction shoes, when they engage and disengage the drum, suffer a change of speed, and therefore a change of clutching force, which compensates for the simultaneous change of speed, and therefore of torque, undergone by the output member of the torque converter.

The invention has been described only in connection with arrangements in which a torque converter is the medium for transmitting power to the automatic change speed gearing. This is the main purpose of the invention, but it may also be useful in some cases to employ the invention in cases where the engine simply drives the automatic change speed gearing through a mechanical or fluid clutch, as the engine itself may develop an increase or decrease of torque consequential upon a change up or change down by the automatic change speed gear, and in any case, the invention, e.g. the use of the auxiliary epicyclic gear, will render the clutching action more positive both for changes up and changes down.

What is claimed, is:

1. An automatic change speed gear, comprising a driving element, a driven element, a step-down transmission train between said driving element and said driven element, said step-down transmission train including a first friction clutch element, a complementary second friction clutch element carried by said driving element, means whereby engagement of said friction clutch elements completes an en bloc connection of said driving element with said driven element, means whereby torque transmitted by said step-down transmission train generates a first force, varying according to said torque and tending to pull said clutch elements out of engagement, and means whereby a second force tends, according to the speed of rotation of said first clutch element, to press said clutch elements into engagement, a portion of said step-down transmission train between the driving element and said first clutch element being a step-down portion, and a portion of said step-down transmission train between said first clutch element and said driven element being a step-up portion.

2. An automatic change speed gear according to claim 1, in combination with a torque converter which delivers to said driving element a torque which increases and decreases according as the speed of said driving element decreases and increases.

3. An automatic change speed gear according to claim 2, wherein said torque converter is a hydro-kinetic torque converter.

4. An automatic change speed gear according to claim 1, wherein said step-down portion of the step-down transmission train comprises a main epicyclic gear and said step-up portion of said step-down transmission train comprises an auxiliary epicyclic gear.

5. An automatic change speed gear according to claim 4, wherein said auxiliary epicyclic gear has an outer annulus coupled to said first clutch element, a sun gear coupled to said driving element, planet gears engaging said sun gear, and a planet carrier coupled to said driven element and supporting said planet gears.

6. An automatic change speed gear according to claim 4, wherein said main epicyclic gear has an outer annulus coupled to said driving element, a sun gear, planet gears engaging said sun gear, and a planet carrier supporting said planet gears and coupled to said first clutch element, and comprising a free wheel device controlling the sun of said main epicyclic gear whereby said sun acts as a stationary reaction member during step-down transmission and is free to rotate forwards during en bloc transmission.

7. An automatic change speed gear according to claim 4, and comprising a free wheel device controlling an outer annulus of said main epicyclic gear so that said outer annulus acts as a stationary reaction member during stepdown transmission and is free to rotate forwards during en bloc transmission, and wherein said main epicyclic gear has a sun gear coupled to said driving element, planet gears engaging said sun gears, and a planet carrier coupled to said first clutch element.

8. An automatic change speed gear according to claim 4 and comprising a free wheel device controlling the sun of said main epicyclic gear, whereby said sun acts as a stationary reaction member during step-down transmission and is free to rotate forwards during en bloc transmission and wherein said main epicyclic gear has an outer annulus coupled to said first clutch element, pairs of planet gears in mesh with each other, one planet of each pair being in mesh with said outer annulus and the other in mesh with said sun, and a planet carrier coupled to said driving element and supporting said planet gears.

9. An automatic change speed gear according to claim 4 and comprising a free wheel device controlling the planet carrier of said main epicyclic gear, whereby said planet carrier acts as a stationary reaction member during step-down transmission and is capable of rotating forwards during an bloc transmission, wherein said main epicyclic gear has an outer annulus coupled to said first clutch element, and its sun coupled to said driving element, and wherein said main epicyclic gear includes a planet carrier, and pairs of planet gears in mesh with each other, with one of each pair in mesh with the outer annulus and the other in mesh with the sun, said planet gears being supported on said planet carrier.

10. An automatic change speed gear according to claim 4 and comprising a free wheel device controlling an outer annulus of the main epicyclic gear and the sun of the auxiliary epicyclic gear, whereby each of said outer annulus and sun acts as a stationary reaction member during step-down transmission and is free to rotate forwards during en bloc transmission, and wherein the sun and a planet carrier of said main epicyclic gear are respectively coupled through planet gears of the auxiliary epicyclic gear to the driving element and said first clutch element, and an outer annulus and a planet carrier of said auxiliary epicyclic gear are respectively coupled through planet gears of the auxiliary epicyclic gear to the driven element and said first clutch element.

11. An automatic change speed gear according to claim 1, wherein said first clutch element moves outwardly into engagement with the complementary clutch element and said second force comprises the centrifugal force of said one clutch element.

12. An automatic change speed gear according to claim 1, wherein said first clutch element moves outwardly into engagement with said complementary clutch element, and wherein the ratio of transmission between the step-down portion of the step-down transmission train and said first clutch element is such that the transmitted force sets up said first force acting inwardly on said first clutch element, and wherein the ratio of transmission between said first clutch element and the step-up portion of the stepdown transmission train is such that the transmitted force is incapable of setting up any force acting inwardly on said first clutch element, whereby said first force ceases to operate during en bloc transmission.

13. An automatic change speed gear according to claim 1, wherein the driving element is coupled to an outer drum having on its inner periphery a clutch surface of said complementary clutch element.

14. An arrangment comprising a plurality of automatic change speed gears, each as defined in claim 4, said change speed gears being connected in series, and an outer drum coupled to the driving element and having on its inner periphery a clutch surface of the complementary clutch element of each of said automatic change speed gears.

15. An arrangement according to claim 14, and comprising a free wheel device controlling the sun of each main epicyclic gear, whereby said sun acts as a stationary reaction member during stepdown transmission and is free to rotate forward during an en bloc transmission, and wherein each main epicyclic gear comprises pairs of plant gears in mesh with each other, with one of each pair in mesh with an outer annulus and the other in mesh with the sun of the main epicyclic gear, and a planet carrier supporting said planet gears.

16. An arrangment according to claim 14, wherein the suns of the main epicyclic gears are mounted through their respective free wheel devices on a common fixed arbor which extends axially into said drum.

References Cited in the file of this patent

UNITED STATES PATENTS

| 2,478,869 | Hasbany | Aug. 9, 1949 |
| 2,562,464 | Jandasek | July 31, 1951 |

FOREIGN PATENTS

| 740,692 | Great Britain | Nov. 16, 1955 |
| 796,948 | Great Britain | June 25, 1958 |